United States Patent [19]

Caramanna

[11] Patent Number: 4,741,417

[45] Date of Patent: May 3, 1988

[54] APPARATUS AND METHOD FOR BLEEDING A HYDRAULIC BRAKE SYSTEM

[75] Inventor: George Caramanna, Phoenix, Ariz., Judith S. Caramanna, legal representative

[73] Assignee: Judith S. Caramanna, Phoenix, Ariz.

[21] Appl. No.: 39,978

[22] Filed: Apr. 20, 1987

[51] Int. Cl.⁴ ............................................. B60T 11/30
[52] U.S. Cl. ...................................... 188/352; 60/584
[58] Field of Search ........................... 60/584; 188/352

[56] References Cited

U.S. PATENT DOCUMENTS 2,209,784  7/1940  Maack et al. ...................... 188/352
3,359,994 12/1967  LaPointe .......................... 188/352 X
4,174,615 11/1979  Kuhn ............................... 188/352 X

FOREIGN PATENT DOCUMENTS 71462  11/1942  Czechoslovakia ................. 188/352
0066388 12/1982  European Pat. Off. ............ 188/352

Primary Examiner—Duane A. Reger
Attorney, Agent, or Firm—M. David Shapiro

[57] ABSTRACT

The invention comprises a method for more efficiently bleeding a hydraulic system of air comprising a method of reversing normal flow of the hydraulic fluid within the hydraulic system, externally recirculating hydraulic fluid from a reservoir at the one end of the system to a cylinder at another end of the system, and watching the system reservoir for bubbles evidencing the escaping gas, and a pump apparatus for efficiently implementing the method.

16 Claims, 1 Drawing Sheet

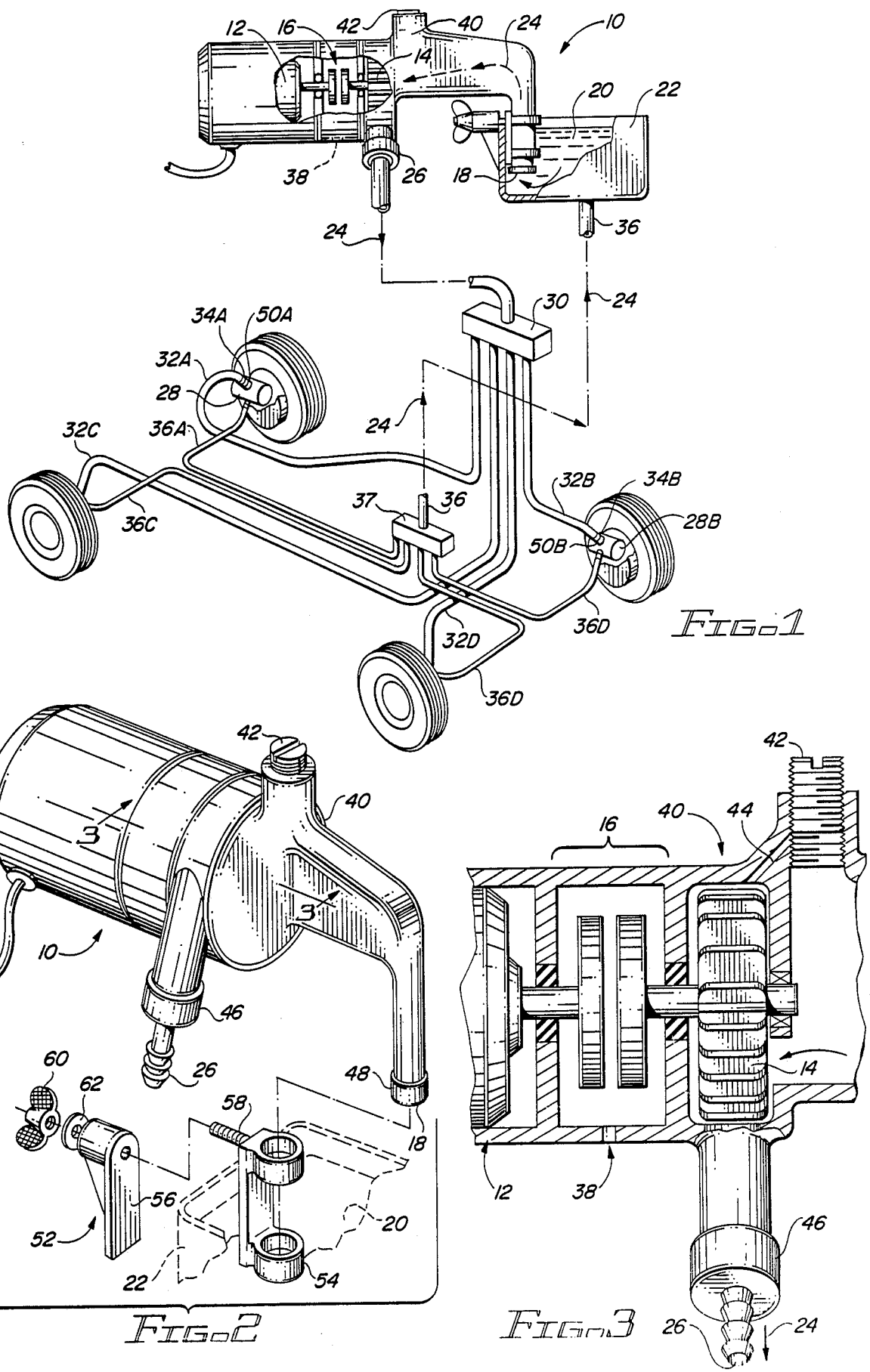

APPARATUS AND METHOD FOR BLEEDING A HYDRAULIC BRAKE SYSTEM

FIELD OF THE INVENTION

The invention relates to an apparatus and a method for bleeding a hydraulic brake system.

BACKGROUND OF THE INVENTION

Since at least the early 1930's, newly manufactured automobiles have been equipped with hydraulically operated brakes. Typically, hydraulic brake fluid is maintained in one or more reservoirs in a master cylinder which is actuated by a foot operated brake pedal in the vehicle operator's cab. Hydraulic fluid pressure is applied through hydraulic lines to actuating wheel cylinders located on each of the wheels of the vehicle. The wheel cylinders are pressurized to operate either a brake shoe (or shoes) against a brake drum or a caliper assembly which operates brake pads against a metal disk to decelerate or stop the vehicle.

It is well known that when such a system is charged with hydraulic fluid, or whenever air is allowed to enter the system for any reason, it is very important to expel all of the air in the system before sealing it for use. If this is not done properly, the air left in the system will be compressed by pressing the brake pedal and the pedal will feel "soft." Worse, where there is more than a minimal amount of air in the system, the brake pedal may go so low as to prevent proper application of the brakes and create a serious safety hazard.

It will be well understood by one of ordinary skill in this art that the same principle would apply to nearly any other hydraulic system employing an actuating cylinder and a pressure producing or operating cylinder. In any such system, it is important to prevent gas (air) entry into the system and to fully expel any such gas in a purging or bleeding process.

There are two well known methods of bleeding the air or other gas out of such a system:

Where the proper equipment is available, bleeding has been accomplished by applying fluid pressure continuously from the master cylinder by applying air pressure at the top of the reservoir and, one by one, or in concert, opening bleed valves which are typically mounted at each wheel cylinder. Air and hydraulic brake fluid is expelled at the opened bleed valve(s) until a steady flow of fluid is emitted without any air content, at which point the bleed valve(s) is closed.

The second method, used where no special equipment is available, comprises depressing the brake pedal, thereby applying fluid pressure to the hydraulic lines, opening a bleed valve (a part of typical prior art brake system wheel cylinders), usually at a single wheel, closing the bleed valve before the brake pedal is released, releasing the brake pedal. This procedure is then repeated until no air bubbles emerge with the fluid at the bleed valve. The procedure is repeated for each wheel until all lines are bled.

In each of these procedures, it is common practice to discard the hydraulic fluid which is expelled from the wheel cylinder bleed valves to prevent contamination of a system which could result from the use of dirty recycled fluid. Such contamination is generally believed to result from exposure of fluid to a dirty atmosphere.

A drawback of each of the systems described is the difficulty in making a determination of exactly when the bleeding process has been completed since an operator must make a decision, while lying prone or standing in a pit beneath the vehicle, as to whether or not there are any air bubbles in the fluid emitted from the bleed valve(s). This is usually accomplished by attaching a short flexible line to each bleed valve as it is used and leading that line below a small amount of hydraulic fluid in a transparent vessel. This facilitates watching for air bubbles. Not infrequently, the collecting vessel is overturned, broken or the short tubing slips out of the vessel (the hydraulic fluid wetted tubing is very slippery) and fluid is spilled beneath the vehicle. It is also possible for an inattentive operator to allow the collecting vessel to fill to overflowing with the same result.

Each of these bleeding methods is labor intensive in that one or more operators must be employed to assure that no new air is introduced into the hydraulic lines and that the master cylinder reservoir does not run dry thereby introducing new air into the system. It is necessary to close each bleed valve while pressure is still being applied at the master cylinder to assure that no air is taken into the system from the bleed valve at each wheel. If multiple lines are bled simultaneously, good procedure demands that an operator be stationed at each wheel cylinder to control that cylinder's bleed valve at the proper time.

SUMMARY OF THE INVENTION

These and other problems with prior art apparatus and methods are resolved by means of the instant invention in which a small pump is utilized to circulate hydraulic fluid taken from the master cylinder through one or more flexible external auxiliary hydraulic lines to each of the wheel cylinder bleed valves (simultaneously or in sequence), through the hydraulic lines of the system being bled and back to the master cylinder. The system of the invention facilitates the operator's task because it is relatively easy for him to watch the master cylinder reservoir for emission of air bubbles and for excessive reduction of fluid in the reservoir as hydraulic fluid takes the place of air in the system being bled. The operator may recharge the master cylinder with hydraulic fluid while he is watching therein for air bubble emission and while the purging of air proceeds.

If desired, all wheel cylinders of the vehicle may be bled simultaneously by manifolding the output of the pump to two or more flexible tubes leading to individual wheel cylinder bleed valves.

The method and apparatus of the invention allows hydraulic fluid to be recycled through the system without fear of any safety hazard or contamination thereof and the cost of otherwise lost fluid is saved. Furthermore, there is much less risk of accidental spills and the safety hazards posed by such spills. Still further, the system of the invention facilitates a more precise method of determination of the lack of air in the system since an operator standing at the master cylinder may more readily determine when the air bubble flow stops.

Therefore, it is an object of the invention to provide an improved apparatus and method of bleeding air from hydraulic systems.

It is another object of the invention to provide a method and apparatus for bleeding hydraulic systems by applying fluid pressure to the receiving (or operating) cylinder of a hydraulic system.

It is still another object of the invention to provide an improved method and apparatus for bleeding a hydraulic system that allows all actuating cylinders in the system to be bled simultaneously by a single operator.

It is yet another object of the invention to provide an improved method and apparatus for bleeding a hydraulic system which allows the fluid in the system to be safely and expeditiously recycled.

It is a further object of the invention to provide an improved method and apparatus for bleeding a hydraulic system which reduces the loss of hydraulic fluid due to the bleeding process.

These and other objects of the invention will be more readily understood upon study of the Detailed Description of the Preferred Embodiment of the Invention, infra, taken together with the drawings, in which, FIG. 1 is a schematic diagram of the bleeding system of the invention as it would appear in use; attached to a vehicular braking system;

FIG. 2 is an external view of the pump and clamp mechanism of the invention; and FIG. 3 is a detailed cross-section of the pump head of the pump of the invention taken from 3—3 of FIG. 2, parallel to the axis of the drive shaft of the pump.

DETAILED DESCRIPTION OF THE PREFERRED EMBODIMENT OF THE INVENTION

It should be noted that wherever in this specification like reference numerals are used they refer to like features of the invention.

FIG. 1 is illustrative, in schematic form, of the apparatus of the invention as it would appear installed on the hydraulic brake system of a four wheeled vehicle.

While the method of the invention might be practiced with many different kinds of pump mechanisms, a preferred embodiment of the pump is shown, in general, in FIG. 1 at reference numeral 10 and the pump head is shown in more detail in FIGS. 2 and 3.

In FIG. 1 it may be seen that pump 10 is equipped with inlet 18 which is immersed in the hydraulic fluid 20 in reservoir 22 of a master cylinder. Impeller 14 is employed to circulate hydraulic fluid 20 in the direction of arrows 24. Fluid 20 is impelled out of outlet 26 of pump 10 to one or more wheel cylinders 28, either via manifold 30, or directly (not shown), through flexible tubing 32. Each wheel cylinder 28 is equipped with a bleed valve 34. Tubing 32 is slipped over each bleed valve 34 in the same manner as was done in prior art practice when similar tubing was connected to a bleed valve to direct exhausted fluid into a transparent vessel for the purpose of observing the exhaust fluid for air bubbles. It is important that bleed valves 34 be cleaned well before coupling tubing 32 to them. This may be accomplished by employing a high pressure air stream or by removing the bleed screws and washing them in a suitable solvent.

Hydraulic brake lines 36, a part of the prior art brake system of the vehicle, connect back to the lower portion of master cylinder reservoir 22, either through manifold 37, or directly (not shown).

In some cases, where a split hydraulic system is employed, a dual reservoir master cylinder is used. In that case, the system would be purged in two steps, one for each reservoir. It is also contemplated that a pump with two inlets, one for each reservoir, would allow purging of both sides of the system simultaneously.

Fluid 20 from pump 10 is picked up from master cylinder reservoir 22 and circulated by impeller 14 to each wheel cylinder 28. When a bleed valve 34 is opened, fluid 20 is directed through its corresponding wheel cylinder 28 (from the highest point therein; because of the design of prior art wheel cylinders and their associated bleed valves), up through the vehicle's hydraulic brake line 36 system, and back to the master cylinder reservoir 22.

Any air in the system is carried, along with fluid 20, back to reservoir 22 through hydraulic lines 36, where it is readily discernable as air bubbles in the master cylinder reservoir 22 fluid 20. Even were there to be some air in the apparatus of the invention when it is applied to the vehicle to be serviced, that air would quickly be transported back to the master cylinder and be expelled from the system in the form of air bubbles, visible to the operator in reservoir 22. When the operator determines that no more air bubbles appear in reservoir 22, he or she proceeds to close each of the bleed valves in use. He may then turn off pump 10 and remove the apparatus of the invention from the vehicle. The master cylinder reservoir 22 is closed to the outside air by re-installing its cap (not shown) thereon in the normal and well known fashion.

The Figures are useful as an aid in understanding some of the inventive features of pump 10 of FIG. 1. The pump of FIG. 1 is motor driven, preferably by electric motor 12. See, FIGS. 2 and 3. It may be battery (not shown) operated and its power source may be the starting battery of the vehicle which is being serviced. Alternatively, other electric or alternative power sources may be utilized. Motor 12 is coupled to pump head 40 by means of a well known magnetic coupler 16 to avoid allowing any hydraulic fluid 20 from gaining access to the mechanism of motor 12. The housing of magnetic coupling 16 may have one or more weep holes 38 therein to allow any hydraulic fluid 20 to leak out thereby protecting motor 12 from contamination by hydraulic fluid 20 from pump head 40.

When pump 10 is packaged for shipment through a distribution system to the end user, it is dry, i.e.; there is no hydraulic fluid in it because of shipping restrictions and safety considerations. When the end user unpacks the apparatus, he is able to unscrew plug 42 and, with pump head 40 in an upright position, as shown, he may charge the system with hydraulic fluid 20 to prime pump head 40 through the open vent provided by removal of plug 42. As air is displaced from the lower extremities of pump head 40 (by entering of hydraulic fluid 20), the air that was in pump head 40 escapes from the opening left by the removal of plug 42. However, the air in the upper region of impeller 14 housing would remain there (as an air pocket) if provisions were not made to expel it. Vent hole 44 is provided so that the air in this region can also escape as fluid 20 is added. When pump head 10 is finally completely filled with fluid 20, plug 42 is replaced and acts not only to seal the access hole which it affords for filling pump head 40, but also seals vent hole 44, in the process. As the plug 42 is screwed home, it generates a small amount of pressure on fluid 20, now in pump head 40, and the excess fluid is expelled through outlet 26, via check valve 46, which requires about 0.5 PSI (pounds per square inch) to overcome its valve action in the forward direction 24. Check valve 48 (FIG. 2), installed in inlet 18, which may also be fitted with a screen or other type filter, is pressurized in a reverse direction and therefore can withstand the very low charging pressure without leaking.

Referring again to FIG. 1, tubing 32 and manifold 30 may be shipped assembled to pump head 40 or separately. In either case, these items are also shipped dry for the same reasons as was explained, supra, for pump head 40. Each of charging tubes 32 are equipped with a check valve 50 at their extremities so that when they are assembled to pump head 40 and charged with hydraulic fluid 20, as described, supra, they maintain that charge of fluid 20 when not in use. Therefore, the entire apparatus of the invention is always primed and ready for use whenever it is connected to a hydraulic system for use in bleeding that system. What little air may be trapped in the system because of the voids caused by making the final connections to the hydraulic system may be quickly flushed out to the master cylinder and expelled from the system into the surrounding atmosphere.

As may be observed from FIG. 2, inlet 18 of pump head 10 is equipped with filter screen 48 which is employed to prevent stray particles from entering the flow system of the invention.

A clamping mechanism 52 is built into an inner side of inlet conduit 18 to allow clamping pump head 40 to a side wall of master cylinder reservoir 22. The clamp comprises member 54 which engages an inner surface of reservoir 22, outer clamp member 56 which engages an outer side of the same wall of reservoir 22, threaded rod 58, which may have a ¼ inch thread of 28 threads per inch, wingnut 60 and washer 62. When inlet tube 18 is lowered into reservoir 22, member 54 is inside the wall of the reservoir and clamp member 56 is arranged to be outside that same wall. The operator tightens wingnut 60 on threaded rod 58 and the resulting clamping action of members 54 and 56 hold pump 10 and pump head 40 to reservoir 22. This frees the operator's hands so that he may turn on pump 10, adjust bleed valves 34 and add hydraulic fluid 20, as necessary, to reservoir 22.

After closing bleed valves 34, he can shut off motor 12 of pump 10 and remove the apparatus from the hydraulic system.

Some vehicular brake system master cylinders have two compartment reservoirs. In that case, the pump is mounted in turn in each compartment and each of two pairs of brakes are bled sequentially, although, as mentioned supra, a dual inlet pump would purge both sides of the system, simultaneously.

While the invention has been described relative to an automotive or other vehicular hydraulic braking system, it will be apparent to one of ordinary skill in this art that the apparatus and method of the invention may be used to bleed any suitably equipped hydraulic system; i.e., any system having a reservoir and bleed valves. While the particular configuration of the pump head described herein is adapted for use in an open reservoir, it is clear that modifications may be made to attach the inlet of such a pump to any access point to the hydraulic fluid of a closed system with similar operation and results, as long as there is an opening provided for the system air to escape from the system, as is inherent in a brake system master cylinder reservoir.

While the invention has been particularly shown and described herein with reference to a preferred embodiment thereof, it will be understood by those skilled in the art that various other modifications and changes may be made to the present invention from the principles of the invention as herein described without departing from the spirit and scope as encompassed in the accompanying claims. Therefore, it is intended in the appended claims to cover all such equivalent variations which may come within the scope of the invention as described.

What is claimed is:

1. A method for bleeding a gas from a hydraulic system comprising the steps of:
    connecting an outlet of an auxiliary pump to at least one operating cylinder in the hydraulic system;
    immersing an inlet of said auxiliary pump in the fluid of at least one master cylinder reservoir in the hydraulic system; and
    circulating hydraulic fluid from said at least one operating cylinder to said master cylinder reservoir within the hydraulic system and from said master cylinder reservoir to said at least one operating cylinder external to the hydraulic system by means of said auxiliary pump, wherein the gas is expelled from the hydraulic system at said master cylinder reservoir of said hydraulic system until any visual evidence of the gas in the fluid of said master cylinder reservoir is eliminated; and
    removing said auxiliary pump from the hydraulic system.

2. The method according to claim 1 wherein said hydraulic system is a braking system for a vehicle and said at least one operating cylinder comprises at least one wheel cylinder of said vehicle, and the gas is expelled in the form of bubbles through said master cylinder reservoir.

3. The method according to claim 2 wherein said connection to said at least one wheel cylinder is accomplished by means of a bleed valve on said at least one wheel cylinder.

4. The method according to claim 1 further comprising the step of:
    purging said auxiliary pump of the gas prior to said connecting steps.

5. The method according to claim 2 further comprising the step of:
    purging said auxiliary pump of the gas prior to said connecting steps.

6. The method according to claim 3 further comprising the step of:
    purging said auxiliary pump of the gas prior to said connecting steps.

7. Apparatus for bleeding a gas from a hydraulic system, the hydraulic system containing a hydraulic fluid, the apparatus comprising:
    auxiliary pump means for circulating the hydraulic fluid;
    first means for connecting an inlet of said auxiliary pump means to at least one point in the hydraulic system;
    second means for connecting at least one outlet of said auxiliary pump means to at least one other point in the hydraulic system; and
    means for allowing the gas to escape from said at least one point of the hydraulic system, wherein said at least one point comprises a fluid filled reservoir of a master cylinder of the hydraulic system, and wherein said at least one other point comprises at least one bleed screw on at least one operating cylinder of the hydraulic system and the gas escapes through the hydraulic fluid in the reservoir, whereby gas bubbles may be observed visually in the fluid, said auxiliary pump means being adaptable for removal from the hydraulic system when not in use for bleeding the hydraulic system.

8. The apparatus according to claim 7 wherein said auxiliary pump means further comprises:

means for priming said auxiliary pump means with a compatible hydraulic fluid prior to a first use thereof, said priming means comprising means for removing a gas from said auxiliary pump means, thereby preventing said auxiliary pump means from introducing any additional gas into said hydraulic system.

9. The apparatus according to claim 8 wherein said means for priming further comprises:
means for priming said first and said second means for connecting.

10. The apparatus according to claim 8 wherein said auxiliary pump means further comprises:
means for preventing said hydraulic fluid from escaping from said auxiliary pump means when said auxiliary pump means is not in use for bleeding the hydraulic system.

11. The apparatus according to claim 10 wherein said means for preventing hydraulic fluid from escaping from said auxiliary pump means further comprises:
means for preventing said hydraulic fluid from escaping from said first and said second means for connecting when the apparatus is not in use for bleeding the hydraulic system.

12. The apparatus according to claim 7 wherein said hydraulic system is a vehicular braking system.

13. The apparatus according to claim 12 wherein said auxiliary pump means further comprises:
means for priming said auxiliary pump means with a compatible hydraulic fluid prior to a first use thereof, said priming means comprising means for removing a gas from said auxiliary pump means, thereby preventing said auxiliary pump means from introducing any additional gas into said hydraulic system.

14. The apparatus according to claim 13 wherein said means for priming further comprises:
means for priming said first and said second means for connecting.

15. The apparatus according to claim 13 wherein said auxiliary pump means further comprises:
means for preventing said hydraulic fluid from escaping from said auxiliary pump means when said auxiliary pump means is not in use for bleeding the hydraulic system.

16. The apparatus according to claim 14 wherein said means for preventing hydraulic fluid from escaping from said auxiliary pump means further comprises:
means for preventing said hydraulic fluid from escaping from said first and said second means for connecting when the apparatus in not in use for bleeding the hydraulic system.

* * * * *